(12) United States Patent
Capitan

(10) Patent No.: US 11,930,239 B2
(45) Date of Patent: Mar. 12, 2024

(54) VIDEO SIGNAL CAPTURE APPARATUS

(71) Applicant: ATEME, Velizy Villacoublay (FR)

(72) Inventor: Jean-Michel Capitan, Vauhallan (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 18/080,328

(22) Filed: Dec. 13, 2022

(65) Prior Publication Data
US 2023/0188778 A1    Jun. 15, 2023

(30) Foreign Application Priority Data

Dec. 13, 2021    (FR) ...................................... 2113406

(51) Int. Cl.
*H04N 21/426*    (2011.01)
*H04N 21/438*    (2011.01)
*H04N 21/462*    (2011.01)

(52) U.S. Cl.
CPC ..... *H04N 21/4263* (2013.01); *H04N 21/4382* (2013.01); *H04N 21/4622* (2013.01)

(58) Field of Classification Search
CPC ........... H04N 21/4263; H04N 21/4382; H04N 21/4622; H04N 5/455; H04N 5/46;
(Continued)

(56) References Cited

U.S. PATENT DOCUMENTS 7,034,632 B2 * 4/2006 Gomez .................... H04N 5/50
333/132
2005/0253663 A1* 11/2005 Gomez .................... H04N 5/50
333/100

(Continued)

FOREIGN PATENT DOCUMENTS

WO    WO-2007023417 A2 * 3/2007 ............... H04B 1/18
WO    WO-2016045449 A1 * 3/2016 ........... H03F 1/0205

OTHER PUBLICATIONS

Vassiliou et al., "CMOS Tuners for Mobile TV," IEEE Communications Magazine, IEEE Service Center, Piscataway, US, Dec. 2006, vol. 44, No. 12, pp. 118-125.
(Continued)

*Primary Examiner* — Fernando Alcon
(74) *Attorney, Agent, or Firm* — Faegre Drinker Biddle & Reath LLP

(57) ABSTRACT

An apparatus for capturing video broadcasting signals comprises a plurality of capture channels, each channel producing respective video transport streams as inputs to a multi-channel virtualization module. Each channel comprises: an input interface powered by a low-noise power supply arranged to receive a respective modulated video broadcasting input signal within an input frequency band; a single input, dual output distribution amplifier arranged to produce first and second amplified input signals within a satellite broadcasting frequency band and within a cable and/or terrestrial broadcasting frequency band, respectively. A first tuner is configured to receive and downconvert the first amplified input signal to generate a first baseband signal; a second tuner is configured to receive and downconvert the second amplified input signal to generate a second baseband signal; and a demodulator is configured to receive the baseband signals as input and to generate the respective video transport stream.

20 Claims, 8 Drawing Sheets

(58) Field of Classification Search
CPC .... H04N 5/50; H04N 21/426; H04N 21/6112; H04N 21/6143; G06F 3/14; G09G 5/006; G09G 2370/10
See application file for complete search history.

(56) References Cited

U.S. PATENT DOCUMENTS

| | | | |
|---|---|---|---|
| 2007/0025691 A1* | 2/2007 | Shoji | H04N 21/4821 348/E7.039 |
| 2008/0060022 A1 | 3/2008 | Kishida et al. | |
| 2008/0259219 A1* | 10/2008 | Abdelgany | H03J 1/005 348/E5.097 |
| 2010/0110307 A1* | 5/2010 | Leme | H04N 5/455 348/731 |
| 2010/0165212 A1* | 7/2010 | Cowley | H04N 5/455 455/150.1 |
| 2010/0265407 A1* | 10/2010 | Kyranas | H03F 3/68 348/707 |
| 2010/0323635 A1* | 12/2010 | Steeper | H04N 21/41407 455/188.1 |
| 2013/0201406 A1* | 8/2013 | Ling | H04N 21/42607 375/340 |
| 2013/0303097 A1* | 11/2013 | Sasho | H04B 1/0064 455/188.1 |
| 2013/0332967 A1* | 12/2013 | Chang | H04N 21/4382 725/68 |
| 2014/0185718 A1* | 7/2014 | Ruelke | H04N 21/42638 375/345 |
| 2014/0337540 A1* | 11/2014 | Johnson | G06F 13/14 710/5 |
| 2017/0346520 A1 | 11/2017 | Pereira et al. | |
| 2020/0328765 A1 | 10/2020 | Yoshida et al. | |

OTHER PUBLICATIONS

Search Report issued in related application FR 2113406, dated Jul. 12, 2022, 2 pages.

\* cited by examiner

VIDEO SIGNAL CAPTURE APPARATUS

CROSS-REFERENCE TO RELATED APPLICATIONS

This application claims priority benefit under 35 U.S.C. § 119(d) from French Patent Application No. 2113406, filed Dec. 13, 2021, the disclosure of which is incorporated by reference herein in its entirety.

FIELD

This disclosure relates to a video signal capture apparatus. It applies in particular to apparatuses for capturing modulated video broadcasting signals.

BACKGROUND

The video capture cards available on the market, both consumer and professional, are limited to certain types of video signal transmission: cable transmission, terrestrial transmission, or satellite transmission. These cards are thus generally designed for capturing one or more DVB-S or S2 type video channels, one or more DVB-T or T2 type video channels, or one or more DVB-C or C2 type video channels.

The specific characteristics of existing cards require using several cards, respectively corresponding to several types of video transmission within the same computer server, each card occupying a different expansion slot within the server. The number of server expansion slots then becomes a constraint that restricts the configuration possibilities of computer servers with slotted video capture cards. This situation leads to little flexibility in the hardware configurations, due to the need to take into account the specific characteristics of the capture card used in each expansion slot available within the computer server.

An object of this disclosure is to at least partially remedy the above disadvantages.

SUMMARY

According to a first aspect, an apparatus for capturing analog-modulated video broadcasting signals is proposed, the apparatus comprising, grouped on an expansion card for a computer server, a controller, a plurality of N capture channels, each of the N capture channels producing a respective video transport stream provided as input to a multi-channel virtualization module delivering frames carrying data of a respective video transport stream among the N respective video transport streams, wherein each of the N capture channels comprises: an input interface powered by a low-noise power supply arranged to receive a respective modulated video broadcasting input signal within an input frequency band; a low-noise radio frequency distribution amplifier with single input and dual outputs, arranged to, on the basis of the respective modulated video broadcasting input signal, produce a first and a second amplified input signal within the input frequency band, wherein the first amplified input signal is within a satellite broadcasting frequency band and the second amplified input signal is within a cable and/or terrestrial broadcasting frequency band; a first tuner configured to receive the first amplified input signal and to downconvert it from the satellite broadcasting frequency band in order to generate a first baseband signal; a second tuner configured to receive the second amplified input signal and to downconvert it from the terrestrial and/or cable broadcasting frequency band in order to generate a second baseband signal; and a demodulator configured to receive the first or second baseband signal as input and to generate the respective video transport stream on the basis of said baseband signal.

As the proposed system is implemented on a single expansion card for a computer server, it advantageously occupies only one expansion slot within the computer server. The proposed apparatus thus advantageously allows, by configuration of each of the N capture channels for capturing cable, terrestrial, or satellite video broadcasting signals, implementing on a same circuit board in the format of a computer server expansion card, a multi-channel and multi-standard video capture apparatus. One embodiment of the proposed apparatus thus makes it possible, for example, to obtain a multi-channel card which allows capturing in a video broadcasting signal channel of type DVD-T/T2, in another video broadcasting signal channel of type DVB-C/C2, and in another video broadcasting signal channel of type DVB-S/S2, all in a computer server expansion card format, for example in the PCI-Express (PCIe) format which is very widespread.

Another advantage of the proposed system thus lies in the fact that it allows implementing a multi-channel virtualization module in a multi-channel video capture card, by making full use of the advantages of video channel virtualization in order to output to the bus of the expansion slot to which the apparatus is connected, from a plurality of respective video transport streams, corresponding video data frames.

The features set forth in the following paragraphs may optionally be implemented. They may be implemented independently of each other or in combination with each other:

In one or more embodiments, the input interface may be coaxial, in order to be able to advantageously connect to the apparatus a cable for receiving satellite broadcasting signals.

In one or more embodiments, the expansion card for computer server is in low-profile PCIe format, so as to advantageously be able to use the proposed apparatus within a computer server or a personal computer equipped one or more PCIe expansion slots.

In one or more embodiments, the input frequency band covers the frequency bands for cable, terrestrial, and satellite broadcasting. The proposed apparatus is thus advantageously a capture apparatus capable of capturing signals over a very wide frequency band corresponding to the juxtaposition of the frequency bands used for different video broadcasting technologies.

For example, in one or more embodiments, the cable broadcasting frequency band covers the DVB-C and DVB-C2 frequency bands, the terrestrial broadcasting frequency band covers the DVB-T and DVB-T2 frequency bands, and satellite broadcasting frequency band covers the DVB-S, DVB-S2, and DVB-S2X frequency bands. The proposed apparatus is thus advantageously a multi-standard DVB capture apparatus.

In one or more embodiments, the low-noise radio frequency distribution amplifier has a single differential input and dual differential outputs, the input interface comprises a hot spot and a ground, and the hot spot of the input interface is electrically coupled to the positive input of the distribution amplifier and the negative input of the distribution amplifier is coupled to the ground of the input interface.

In one or more embodiments, the first and second tuners have differential inputs, and a first differential output of the amplifier is coupled to the differential input of the first tuner, and a second differential output of the amplifier is coupled to the differential input of the second tuner.

In one or more embodiments, the first tuner has a single input and dual I/Q outputs to the demodulator.

In one or more embodiments, the first and second tuner and the distribution amplifier are each covered with radio frequency shielding so as to advantageously protect these components from the electromagnetic interference which would otherwise be generated by digital or power supply components.

In one or more embodiments, one or more of the plurality of N capture channels comprises a first dual tuner comprising two tuners each of the type of the first tuner, a second dual tuner comprising two tuners each of the type of the second tuner, and a dual demodulator comprising two demodulators of the type of the demodulator and configured to receive the first and second baseband signals as input and to generate, on the basis of the first and second baseband signals, a respective dual video transport stream supplied as input to the multi-channel virtualization module. In one or more embodiments, each of the plurality of N capture channels comprises a dual demodulator configured to receive the first and second baseband signals as input, and to generate on the basis of the first and second baseband signals a respective dual video transport stream supplied as input to the multi-channel virtualization module.

In one or more embodiments, the proposed apparatus comprises four capture channels, each comprising a respective first dual tuner, a respective second dual tuner, and a respective dual demodulator, and is thus configured to supply at most eight video transport streams to the multi-channel virtualization module. In these embodiments, the proposed apparatus advantageously provides a circuit board, in the format of an expansion card for a computer server (for example a card in low-profile PCIe format), enabling the parallel capture of eight video broadcasting signals, each of the eight video broadcasting signals able to be of the DVB-T/T2 type, DVB-C/C2 type, or DVB-S/S2 type.

BRIEF DESCRIPTION OF THE DRAWINGS

Other features and advantages of the present disclosure will become apparent in the following description of some non-limiting embodiments, with reference to the accompanying drawings, in which.

DETAILED DESCRIPTION

Figure 1:
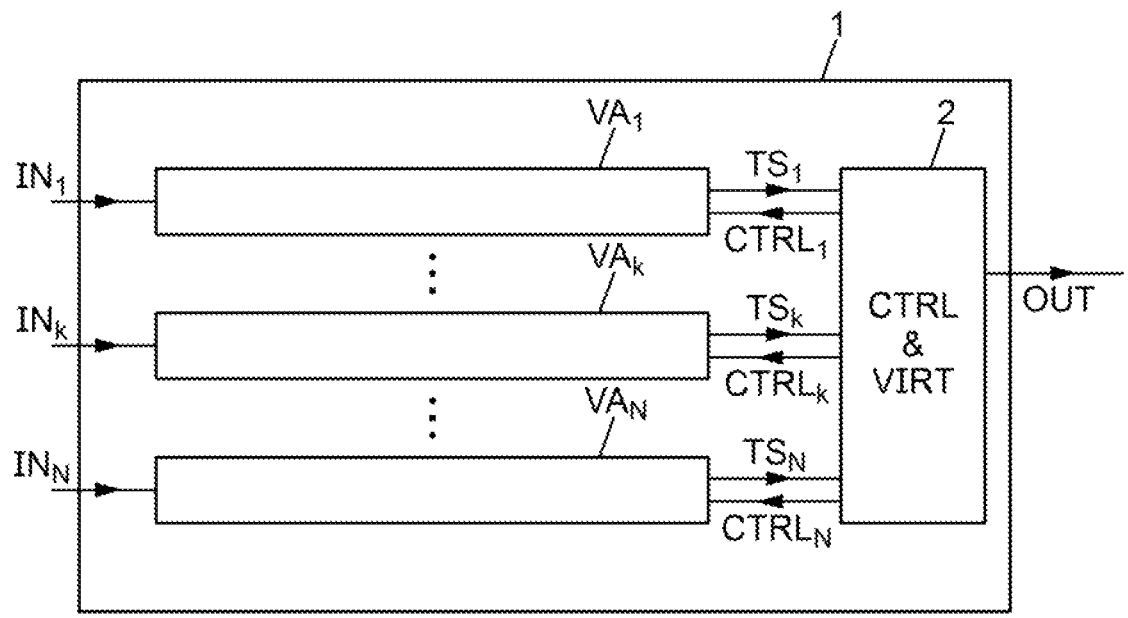
FIG. 1 is a diagram illustrating an example apparatus for capturing video signals according to one or more embodiments.

In the following detailed description of some embodiments of the present disclosure, many specific details are presented to provide a more complete understanding. Nevertheless, those skilled in the art can appreciate that some embodiments may be implemented without these specific details. In other cases, well-known features are not described in detail to avoid unnecessarily complicating this description.

This application refers to functions, engines, units, modules, platforms, and diagram illustrations of the methods and apparatuses according to one or more embodiments. Except as otherwise provided herein, each of the described functions, engines, modules, platforms, units, and diagrams may be implemented in hardware, software (including embedded software ("firmware"), or "middleware")), microcode, or any combination thereof. In the case of a software implementation, the functions, engines, units, modules, and/or diagram illustrations may be implemented by computer program instructions or software code, which may be stored or transmitted on a computer-readable medium, including a non-transitory medium, or a medium loaded into the memory of a generic or specific computer or other programmable data processing apparatus or system in order to produce a machine, such that the computer program instructions or the software code executed on the computer or the programmable data processing apparatus or system constitute means of implementing these functions.

In addition, the terms "in particular", "for example", "example", "typically" are used in this description to designate examples or illustrations of non-limiting embodiments, which do not necessarily correspond to preferred or advantageous embodiments in comparison to other possible aspects or embodiments.

The expressions "analog subassembly", "radio frequency subassembly", "analog/radio frequency subassembly", "analog part", "radio frequency part", "radio frequency chain", and "RF chain" are used interchangeably in this description to designate subassemblies of one or more electronic components (which are then referred to as "analog") which are configured to process analog signals (such as analog radio frequency signals, in which case the analog components can be referred to as "radio frequency"). The expressions "digital subassembly" and "digital part" are used interchangeably in this description to designate subassemblies comprising one or more electronic components (which are then referred to as "digital") configured for processing digital signals. The expressions "power supply subassembly" and "power supply part" are used interchangeably in this description to designate electrical power supply subassemblies comprising one or more electronic power supply components (which are then referred to as "power supply <noun>").

The terms "operably coupled", "coupled", "connected", and their various variations and forms used herein refer to physical, electrical, electronic, or mechanical couplings and connections, which may be direct or indirect, and in particular comprise connections between electronic components (for example in the form of a copper trace), between electronic apparatuses, or between portions of such apparatuses which enables operations and functioning as described in this application.

FIG. 1 illustrates an example of a video signal capture apparatus according to one or more embodiments.

The apparatus 1 of FIG. 1 comprises N capture channels $VA_1 \ldots VA_N$. Each of the N capture channels $VA_k$ produces a video transport stream $TS_i$ supplied as input to a multi-channel virtualization module 2. In one or more embodiments, apparatus 1 comprises N=4 capture channels $VA_1$, $VA_2$, $VA_3$ and $VA_4$.

In one or more embodiments, the N capture channels $VA_k$ of apparatus 1 and the multi-channel virtualization module 2 are installed on an expansion card, for example for a computer server, which has the advantage of enabling insertion of apparatus 1 into any computer apparatus having an expansion slot in the corresponding format, for example such as a personal computer, a computer server, etc.

Depending on the embodiment, the expansion card may be in PCI (acronym for "Peripheral Component Interconnect") format, PCIe (acronym for "PCI Express"), SATA (acronym for "Serial Advanced Technology Attachment"), CXL (for "Compute Express Link"), or any other expansion card format, for example for a computer server. Providing an apparatus for capturing modulated video broadcasting signals in PCIe expansion card format makes it possible to take advantage of the very widespread use of this expansion card format in all types of computer apparatuses. In the following, we consider the non-limiting example of a capture apparatus implemented on an expansion card in low-profile PCIe format. Nevertheless, those skilled in the art will realize that the proposed apparatus is not limited to a particular expansion card format, and that any expansion card format for a computer server may be used in embodiments of the proposed apparatus.

However, due to its small size, the low-profile PCIe format chosen for this implementation requires placing the components of each of capture channels $VA_k$ close to each other, which causes electromagnetic interference that should be treated in order to obtain a desirable level of performance for a professional-grade video capture card.

With reference to FIG. 1, each capture channel $VA_k$ comprises an input interface unit configured to receive a respective input video signal $IN_k$. Capture channel $VA_k$ is configured to process input video signal $IN_k$ received, and to generate as output a respective demodulated video stream referred to as a video transport stream (or "TS") $TS_k$, and to supply it as input to multi-channel virtualization module 2.

In one or more embodiments, multi-channel virtualization module 2 may be implemented within a component, for example of the FPGA type, which will further comprise a control module for the proposed apparatus, and a capture channel driver module configured to configure and/or control one or more capture channels $VA_k$, for example by means of a control signal $CTRL_k$. Depending on the embodiment, the multi-channel virtualization module, control module, and driver module may be implemented within one or more electronic components of the proposed apparatus, and may be implemented (separately or jointly) as software, as hardware such as an ASIC-type circuit, or as a combination of hardware and software elements, for example such as a software program intended to be loaded and executed on an FPGA type of component. The control module will typically be configured to drive the operations of the other modules of the proposed apparatus, and may be, depending on the embodiment, a component or part of a component implementing one or more processors or a computing unit, operably coupled to a memory, to control the operations of the proposed apparatus, and in particular to control the virtualization module and the driver module for the capture channels.

In one or more embodiments, multi-channel virtualization module 2 may be configured to generate as output, from N video transport streams received as input, a stream of frames OUT, each carrying data of a video transport stream among the N video transport streams provided as input to multi-channel virtualization module 2. Depending on the embodiment, the format of the frames will preferably correspond to the format of the expansion card on which video capture apparatus 1 is installed.

For example, output stream OUT may comprise protocol frames corresponding to the format selected for the expansion card (for example, PCI, PCIe, SATA, CXL). In the preferred embodiment in which video capture apparatus 1 is installed on an expansion card in PCIe format, multi-channel virtualization module 2 will be configured to output on a PCIe bus, for example of a computer server, a stream of PCIe protocol frames, each carrying data of a video transport stream $TS_k$ among the N video transport streams $(TS_k)_{k=1, \ldots, N}$ provided as input to multichannel virtualization module 2.

In one or more embodiments, the printed circuit of the circuit board of apparatus 1 may be configured with a ground plane comprising an analog ground and a digital ground (sometimes also called a mechanical ground) which are separate from one another. In the figures, a digital ground is represented by a rake symbol, while an analog ground is represented by a downward arrow. The digital grounds are grounds provided to receive noisy signals (for example from digital switching noise), while the analog grounds are, unlike the digital grounds, intended to be isolated from these noisy signals.

Figure 2A:
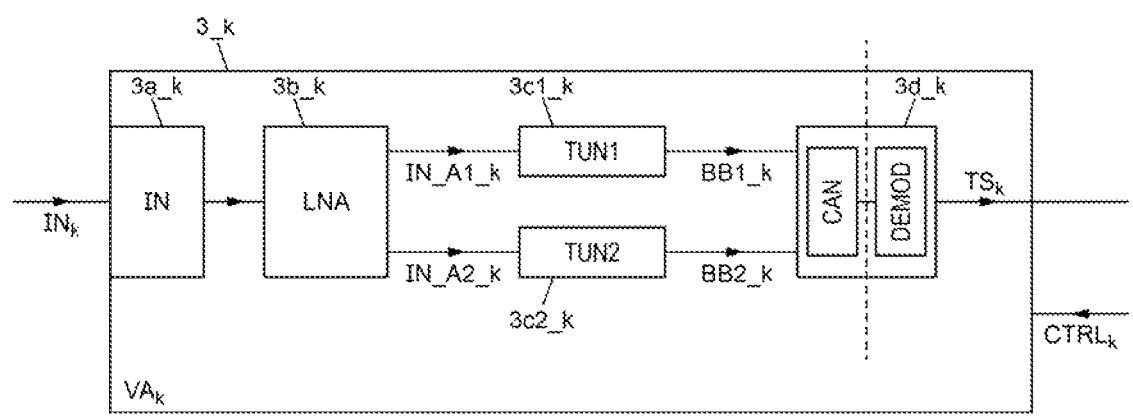
FIG. 2a is a diagram illustrating an example capture channel according to one or more embodiments.

FIG. 2a illustrates an example of a capture channel according to one or more embodiments, for example usable for one or more of capture channels $VA_k$ of a video capture apparatus of the type illustrated in FIG. 1.

Capture channel $3\_k$ $VA_k$ in FIG. 2a comprises an input interface (IN) $3a\_k$, a low-noise radio frequency distribution amplifier (LNA) $3b\_k$, a first tuner (TUN1) $3c1\_k$, a second tuner (TUN2) $3c2\_k$, and a demodulator (CAN/DEMOD) $3d\_k$.

Input interface $3a\_k$ is arranged to receive a modulated video broadcasting input signal $IN_k$ in an input frequency band $F\_IN_k$.

In one or more embodiments, input interface $3a\_k$ will advantageously be configured to receive signals over a wide frequency band covering different video broadcasting frequency bands. For example, input interface $3a\_k$ could be configured to receive signals over a wide input frequency band $F\_IN_k$ covering the cable video broadcasting frequency band, the terrestrial video broadcasting frequency band, and the satellite video broadcasting frequency band.

In one or more embodiments, the cable video broadcasting frequency band may cover the frequency bands for DVB-C ("Digital Video Broadcasting—Cable") and DVB-C2 ("Digital Video Broadcasting—Cable 2" or "Digital Video Broadcasting—Second Generation Cable") (DVB ("Digital Video Broadcasting") standards for cable transmissions, in a radio frequency band between approximately 40 MHz and 400 MHz), the terrestrial video broadcasting frequency band may cover the frequency bands for DVB-T (Digital Video Broadcasting—Terrestrial) and DVB-T2 ("Digital Video Broadcasting—Terrestrial 2" or "Digital Video Broadcasting—Second Generation Terrestrial") (DVB standards for terrestrial transmissions, in a radio frequency band between approximately 400 MHz and 800 MHz), and the satellite video broadcasting frequency band used may cover the frequency bands of DVB-S ("Digital Video Broadcasting—Satellite"), DVB-S2 ("Digital Video Broadcasting—Satellite 2" or "Digital Video Broadcasting—Second Generation Satellite"), and DVB-S2X ("Digital Video Broadcasting—Second Generation Satellite Extension") (DVB standards for satellite transmissions, in a radio frequency band between approximately 900 MHz and 2.2 GHz). Capture channel $3\_k$ can thus advantageously be configured to receive, as input, signals corresponding to different video broadcasting standards in corresponding frequency bands.

Referring again to FIG. 1, video capture apparatus 1 comprising one or more capture channels of the type illustrated in FIG. 2a will thus advantageously be a multi-band video capture apparatus, to which it will be possible to connect, at the user's choice, a carrier for cable, terrestrial, or satellite video broadcasting signals. The input signal $IN_k$ that the proposed apparatus will be capable of capturing may thus be a wide-band analog signal carrying a radio frequency signal within the satellite broadcasting frequency band, a radio frequency signal within the terrestrial broadcasting frequency band, and/or a radio frequency signal within the cable broadcasting frequency band.

In one or more embodiments, the proposed apparatus may have N=4 capture channels of the type illustrated in FIG. 2a and described below. Each of the four capture channels of the proposed apparatus will thus be configured to produce a respective video transport stream, so that the apparatus can provide four video transport streams as input to the virtualization module.

With reference to FIG. 2a illustrating a capture channel $VA_k$, signal $IN_k$ received at input interface IN $3a\_k$ is supplied to a low-noise radio frequency distribution amplifier LNA $3b\_k$ with single input and dual differential outputs IN_A1_$k$ and IN_A2_$k$. In one or more embodiments, amplifier $3b\_k$ will be configured to produce, from modulated video broadcasting input signal $IN_k$ received at input interface $3a\_k$, a first input signal IN_A1_$k$ amplified within a satellite broadcasting frequency band, and a second input signal IN_A2_$k$ amplified within a cable and/or terrestrial broadcasting frequency band. The path of the satellite broadcasting signals, operating in a high frequency band, and that of the cable or terrestrial broadcasting signals, operating in a comparatively lower frequency band, will therefore be separated by means of amplifier $3b\_k$, so as to supply the satellite broadcasting signals and the cable or terrestrial broadcasting signals respectively to first and second tuners TUN1 $3c1\_k$ and TUN2 $3c2\_k$ which work on signals in corresponding frequency bands.

In one or more embodiments, first tuner $3c1\_k$ will be configured to receive first amplified input signal IN_A1_$k$ and to downconvert it from the satellite broadcasting frequency band in order to generate a first baseband signal BB1_$k$, and second tuner $3c2\_k$ will be configured to receive second amplified input signal IN_A2_$k$ and to downconvert it from the cable and/or terrestrial broadcasting frequency band in order to generate a second baseband signal BB2_$k$.

In one or more embodiments, a converter-demodulator CAN/DEMOD $3d\_k$ will be configured to receive as input, according to the input signal supplied to capture channel $VA_k$, first baseband signal BB1_$k$ or second baseband signal BB2_$k$, and to generate a video transport stream $TS_k$, on the basis of the baseband signal (BB1_$k$ or BB2_$k$). Converter-demodulator $3d\_k$ may typically comprise an analog-to-digital converter coupled to a digital demodulator configured to demodulate the digital signal produced by converter CAN based on analog signal BB1_$k$ or BB2_$k$ received as input.

Thus, in the case where input interface $3a\_k$ is connected to a source of a satellite video broadcasting input signal $IN_k$, this signal is amplified by amplifier $3b\_k$ to generate a satellite video broadcasting signal of amplified input IN_A1_$k$. The frequency of satellite video broadcasting signal of amplified input IN_A1_$k$ is translated by tuner TUN1 $3c1\_k$ to generate a baseband signal BB1_$k$, which is input to converter-demodulator $3d\_k$, where it is demodulated to produce video transport stream $TS_k$. In the event that input interface $3a\_k$ is connected to a source of a cable or terrestrial video broadcasting input signal $IN_k$, this signal is amplified by amplifier $3b\_k$ to generate a cable or terrestrial video broadcasting signal of amplified input IN_A2_$k$. The frequency of cable or terrestrial video broadcasting signal of amplified input IN_A2_$k$ is translated by tuner TUN2 $3c2\_k$ to generate a baseband signal BB2_$k$, which is input to converter-demodulator $3d\_k$ where it is demodulated to produce video transport stream $TS_k$.

As illustrated in FIG. 2a, the input interface processing circuits $3a\_k$, amplifier $3b\_k$, first and second tuners $3c1\_k$ and $3c2\_k$, and analog-to-digital converter in converter-demodulator $3d\_k$ process analog signals, while the demodulator of converter-demodulator $3d\_k$, or, with reference to FIG. 1, some components of multi-channel virtualization module 2, for example memory components such as DDR SDRAM components ("Double Data Rate Synchronous Dynamic Random Access Memory"), will process digital signals and power supply signals. Capture channel $3\_k$ therefore comprises analog components which form an "analog environment" (which can be viewed as an analog part) of the channel, while the demodulator of converter-demodulator $3d\_k$, as well as other digital and/or power supply components of the environment external to capture channel $3\_k$ form a "digital/power supply environment" (which can be viewed as a digital/power supply part comprising a digital part and/or a power supply part) of the capture channel, which is likely to generate electromagnetic noise that will come to interfere with the operation of the analog part of the capture channel.

Due to the proximity of the components implemented on the same circuit board, the components which process digital signals, such as the demodulator of converter-demodulator $3d\_k$, or (with reference to FIG. 1) components of multi-channel virtualization module 2, are likely to generate spurious signals disrupting (potentially greatly) the operation of the components which process analog signals, causing performance losses affecting the entire video capture apparatus, in particular when all components of the proposed capture apparatus are grouped together on a circuit board of small dimensions, such as a card in low-profile PCIe format for example. The choice of a small card leads to a high density of electronic components on the card, including subsets of components which process analog signals (in particular radio frequency signals) (analog part of the card), subsets of power supply components (power supply part of the card's environment comprising the card and its external environment (for example the power supply of a server into which the card is inserted), and subassemblies of components processing digital signals (digital part of the card).

Similarly, when the proposed apparatus is inserted, for example in the form of an expansion card, inside the case of a computer server or a personal computer, the components of the computer server or, where appropriate, of the personal computer, which typically process digital signals or power supply signals, are likely to generate spurious signals which greatly interfere with the proper operation of the components which process analog signals, causing local performance losses affecting the overall performance of the video capture apparatus.

The components which process digital signals and surround the components of the apparatus which process analog signals will, for example, generate harmonics which will cause spectral aliasing interference in the processing of analog signals within the desired frequency band (typically including the C, T, and S frequency bands).

In order to achieve the desired level of performance for the proposed apparatus (for example a level of spurious-free dynamic range ("SFDR") of at least 60 dB for a professional reception quality, while consumer electronics products generally have SFDR performances not exceeding 40 dB), it is therefore necessary to minimize, or even eliminate, radio interference noise from the computing machine into which the apparatus is inserted at the time of use.

In one or more embodiments, input interface $IN_k$ is powered by a low-noise power supply, so that a cable for receiving satellite video broadcasting signals can be connected to it in order to provide electrical power to a dish which may be connected to the input interface $IN_k$ by means of a cable (typically coaxial).

The composition of the capture channel in FIG. 2a provides multiple advantages in that it provides a response to the following technical problems, which arise in particular for a multi-standard capture apparatus (for example which can be configured to capture broadcasting signals in DVB-T/T2 (terrestrial broadcasting standards, referred to as "T"), DVB-C/C2 (cable broadcasting standards, referred to as "C"), and DVB-S/S2 (satellite broadcasting standards, referred to as "S")) whose components are grouped at a high density on a circuit board (for example of small dimensions, such as an expansion card for a computer server, for example in low-profile PCIe format):

Amplifier LNA, for example configured to achieve an amplification of +12 dB, will preferably be selected to act on signals within the input frequency band selected for the apparatus (typically from 40 MHz to 2.2 GHZ for a C/T/S multi-standard capture apparatus). In one or more embodiments, amplifier LNA must therefore be configured to act on a wide frequency band corresponding to the juxtaposition of the respective frequency bands of the standards concerned. Consequently, the noise generated in this frequency band by the system comprising the apparatus and the computing machine into which the apparatus is inserted may be amplified by amplifier LNA, which should be avoided in order to avoid such interference.

The issue of the digital environment disrupting the operation of the analog components of the proposed apparatus therefore arises, and acutely so, for amplifier LNA of each capture channel $VA_k$ of the apparatus, because it is part of the radio frequency (RF) chain of channel $VA_k$.

Because, in one or more embodiments, the tuners used each typically incorporate a phase-locked loop (PLL) analog component (the PLL component itself comprising a voltage-controlled oscillator (VCO) which is analog), the noise generated by the surrounding digital components is also likely to degrade the performance of the PLL component of each tuner, by degrading the purity of the frequency of the signal generated by the PLL component of the tuner.

The performance of the components of the RF chain of each capture channel (typically amplifier LNA and each tuner component) is therefore degraded by the noise generated in the input frequency band selected for the apparatus, by the digital components surrounding the components of the RF chain, i.e. the digital and power supply components of the circuit board on which the apparatus components are installed, and the digital and power supply components of the apparatuses (power supply, memory(ies), processor(s), etc.) of the computing machine (computer server, personal computer, etc.) into which the proposed apparatus is inserted.

The tuner components currently available on the market do not act on an input frequency band as wide as the one necessary for a multi-standard video broadcasting apparatus (the frequency bands of the DVB standards for cable and terrestrial broadcasting (C/C2 and T/T2) typically corresponding to the frequency band between 40 MHz and 800 MHz, while the frequency band of DVB standards for satellite broadcasting typically covers the band between 900 MHz and 2.2 GHz), and act either on frequency bands corresponding to the DVB standards for cable and/or terrestrial broadcasting (C/C2 and/or T/T2) (typically between 40 MHz and 800 MHz), or on the frequency band corresponding to the DVB standards for satellite broadcasting (S/S2) (typically between 900 MHz and 2.2 GHz). In one or more embodiments, each capture channel of the proposed apparatus thus comprises two tuners: a first tuner (satellite) TUN1 configured to act on the frequency band corresponding to the DVB standards for satellite broadcasting (S/S2) (typically between 900 MHz and 2.2 GHz), and a second tuner TUN2 (cable and/or terrestrial) configured to act on the frequency bands corresponding to the DVB standards for cable and/or terrestrial broadcasting (C/C2 and/or T/T2) (typically between 40 MHz and 800 MHz).

In a system comprising a transmitter and a receiver, the transmitter being a satellite dish receiver which produces an input signal supplied via a cable (typically coaxial) to the proposed apparatus functioning as the receiver of the system, the transmitter has an output impedance, for example substantially equal to 75 ohms for a satellite dish transceiver configured to receive DVB video broadcasting signals by satellite. It is desirable, in order to conserve the energy of the signals supplied by the transmitter as input to the transmitter, and to avoid signal return loss, that the receiving chain of the receiver be impedance-matched. For example, the input impedance of a receiver receiving signals transmitted by a satellite dish receiver must be approximately equal to 75 ohms.

Tuner components currently available on the market are typically supplied with specifications for use with predefined components so that their input impedance is approximately equal to 75 ohms in the operating frequency band of the tuner.

Figure 2B:
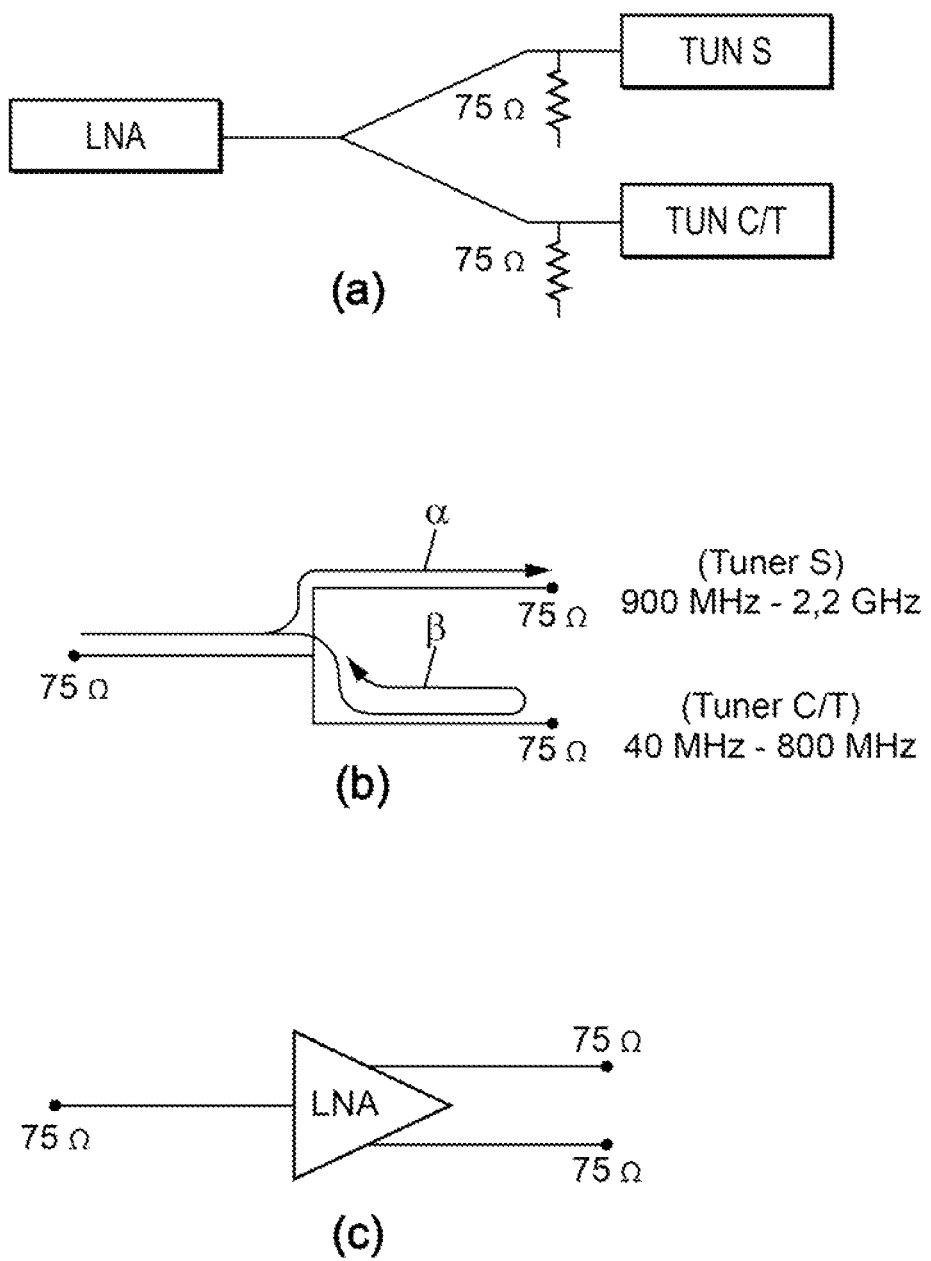
FIG. 2b is a is a set of diagrams illustrating examples of amplifier-demodulator coupling configurations, diagram (c) illustrating an example of a low-noise amplifier according to one or more embodiments.

However, the use of two tuners to design a DVB multi-standard capture apparatus (C and/or T, and S) would lead, as illustrated in FIG. 2b(a), to splitting into two the signal coming from the transmitter (for example a single output LNA) whose impedance is 75 ohms, in order to feed two tuners (TUN S and TUN C/T), each having an impedance substantially equal to 75 ohms in the respective frequency band used by the tuner. The impedance of the source would then no longer be matched to that of the two tuners, and an impedance mismatch problem would appear.

In addition, the impedances of the first and second tuners are equal to 75 ohms only in the frequency band used by each tuner: for example, the impedance of the first tuner (satellite) configured to act on the frequency band corresponding to the DVB standards for satellite broadcasting (S) (typically between 900 MHz and 2.2 GHz) is substantially equal to 75 ohms only in this frequency band, and the impedance of the second tuner (cable and/or terrestrial) configured to act on the frequency bands corresponding to the DVB standards for cable and/or terrestrial broadcasting (C/C2 and/or T/T2) (typically between 40 MHz and 800 MHz) is substantially equal to 75 ohms only in this frequency band. For example, the impedance of the second tuner will be substantially equal to 75 ohms for signal frequencies up to 800 MHz, then will drop for signal frequencies greater than 800 MHz. Similarly, the impedance of the second tuner will be substantially equal to 75 ohms for signal frequencies up to 2.2 GHz, then will drop for signal frequencies above 2.2 GHz.

Therefore, if we chose to split the copper trace (as illustrated in FIG. 2b (a) and (b)), i.e. the signal path from the source (whose impedance is substantially equal to 75 ohms) into two branches, each supplying one of the two tuners of the proposed apparatus (respectively the first and second tuner), we would create another situation of impedance mismatch for frequency signals not within the frequency band for which the first and/or the second tuner has an input impedance substantially equal to 75 ohms.

For example, in reference to FIG. 2b (b), for a satellite video broadcasting type of received signal, the main path (α) of the received signal (which will be in the frequency band between 900 MHz and 2.2 GHz) will be, exiting amplifier LNA, the path leading to the first tuner (satellite). However, there will be a second path (β) leading to the second tuner (cable and/or terrestrial) to which part of the received signal will circulate, which will generate reflections (a path sometimes called a "stub", to designate the path of a parasitic wave which makes a round trip) due to impedance mismatch of the second tuner for signal frequencies within the frequency band of 900 MHz to 2.2 GHz, reflections which will be out of phase with a phase shift that is dependent on the signal propagation time in the second path (a not-insignificant time for very high frequency signals). At worst, this phase shift can be substantially equal to $\pi$, and therefore in phase opposition, which will lead to a reflection which will greatly attenuate the received signal, which is similar to filtering the received signal by a notch filter.

The diagram illustrated in FIG. 2b (parts (a) and (b)) is therefore not usable for a multi-standard capture apparatus once a high level of performance (professional level) is desired.

In one or more embodiments, each capture channel of the proposed apparatus comprises a low-noise radio frequency distribution amplifier with single input and dual outputs, as illustrated in FIG. 2b(c), which acts as a dual LNA with independent outputs while covering a wide frequency band, corresponding for example to a C/T/S multi-standard apparatus (approximately 40 MHz to 2.2 GHz).

The use of a low-noise radio frequency distribution amplifier with single input and dual outputs advantageously allows the apparatus to operate with an amplifier having disjoint outputs (due to the configuration of the amplifier with significant rejection between outputs) while each having an impedance substantially equal to 75 ohms, such that any reflections received on an output when the other output is primarily used, due to impedance mismatching of this output for the frequency band of the signals received and amplified by the amplifier, do not impact the signals of the other output which travel from this other output to a tuner that is impedance matched for the frequency band of these signals.

Figure 3A:
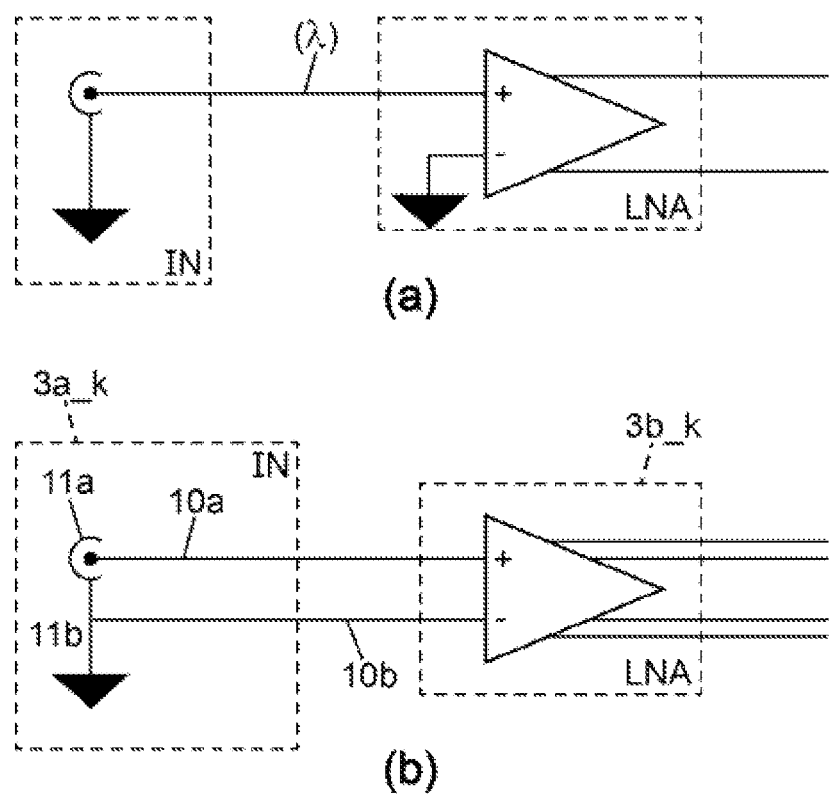
FIG. 3a is a diagram illustrating part of an example capture channel according to one or more embodiments.

With reference to FIG. 3a (b), in one or more embodiments, the low-noise radio frequency distribution amplifier $3b\_k$ has a single differential input and dual differential outputs, so as to advantageously provide better immunity to noise.

With reference to parts (a) and (b) of FIG. 3a, the single differential input of the low-noise amplifier advantageously makes it possible to prevent noise signals, present in the signal path (λ) coming from input interface IN of the capture channel, from interfering with the signal coming from input interface 11a, and to prevent these noise signals from being amplified by the amplifier, which would be the case in a diagram of the type illustrated by FIG. 3a(a).

In order to cancel out electrical interference occurring on the signal path between the signal coming from input interface $3a\_k$ and the input of amplifier $3b\_k$, input interface $3a\_k$ can be configured to include a hot spot 11a and a ground 11b. As shown in FIG. 3a(b), in one or more embodiments, hot spot 11a of input interface $3a\_k$ can be electrically coupled 10a to the positive input of the distribution amplifier $3b\_k$, and the negative input of the distribution amplifier can be electrically coupled 10b to ground 11b of input interface $3a\_k$.

In one or more embodiments, low-noise radio frequency distribution amplifier $3b\_k$ may have, as illustrated in FIG. $3a(b)$, a single differential input and dual differential outputs. For example, low-noise radio frequency distribution amplifier $3b\_k$ may be configured to split each of the differential input paths into two paths which are respectively input to two differential output amplifiers. For example, the amplifier may be of the 1:2 type, configured to distribute one input to two outputs.

In order to immunize the captured signals even more strongly against noise signals, part of the analog capture chain of the proposed apparatus, larger than the subassembly of the input interface and amplifier LNA, may advantageously be composed of differential components.

Figure 3B:
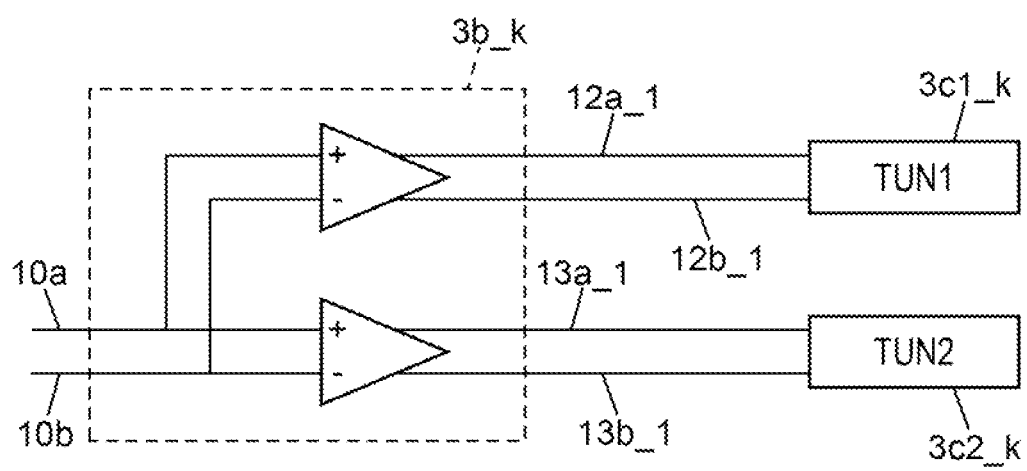
FIG. 3b is a diagram illustrating part of an example capture channel according to one or more embodiments.

For example, as illustrated in FIG. 3b, in one or more embodiments, the first and second tuners may be selected to have differential inputs. In these embodiments, in a capture channel $VA_k$, a first differential output $12a\_1$, $12b\_1$ of amplifier $3b\_k$ can be coupled to the differential input of first tuner $3c1\_k$, and a second differential output $13a\_1$, $13b\_1$ of amplifier $3b\_k$ can be electrically coupled to the differential input of second tuner $3c2\_k$.

In one or more embodiments, the analog areas, parts, or components of the proposed apparatus may be isolated from external interference so as to improve its operation, by shielding (for example radio frequency shielding) (which in one or more embodiments may comprise a shielding cover) to cover these sensitive parts.

For example, in one or more embodiments, the analog areas, parts, or components of one or more capture channels of the proposed apparatus are protected from external electromagnetic interference by shielding, comprising for example a shielding cover. The shielding cover effectively protects the electronic signals circulating under the shielding cover so that they are not disrupted by noise, and in particular the high-frequency noise outside the shielding cover. In one or more embodiments, the shielding protecting an analog part from surrounding electromagnetic noise comprises a shielding cover and one or more copper ground layers (preferably analog) formed in the copper of the printed circuit of the circuit board of the apparatus to close off the shielding in the circuit board and to face the shielding cover.

For example, a digital configuration bus $CTRL_k$, for example of the I2C type, which could be used in the proposed apparatus in order to come from a controller component of the apparatus configured to configure configurable parameters of the analog components of one or more of the capture channels of the proposed apparatus (for example such as the gain of the low-noise amplifier if this amplifier has variable gain), will generate signals disruptive to these analog components.

Depending on the chosen embodiment, radio frequency shielding may be used to protect one or more of the radio frequency components of the apparatus from noise signals coming from digital components of the apparatus and/or from the computing machine into which the apparatus is inserted. For example, the entire ecosystem of the low-noise radio frequency amplifier, i.e. all components integrated into the proposed apparatus including the amplifier apparatus itself as well as other components used to implement the amplifier component, the entire ecosystem of each tuner component, and/or the entire ecosystem of the analog-to-digital converter (ADC) component, can be protected by a radio frequency shielding or cover. However, in some embodiments of the proposed apparatus, in particular in embodiments where differential signal paths are used in the analog-to-digital converter component, it may be considered that this component is less sensitive to noise from the digital environment due to the use of the differential paths (in particular when it appears that these differential paths sufficiently reduce the intensity of the noise signals which would disrupt the signal processed by the analog-to-digital converter component), and that it is therefore not necessary to shield this component or its environment.

In particular, with reference to FIG. 2a, in one or more embodiments, input interface IN $3a\_k$ of each capture channel may be protected by shielding, and for example be coaxial, for example in order to be able to advantageously connect, to the input of capture channel $3\_k$ $VA_k$, a coaxial cable for receiving radio frequency signals, for example such as a cable for receiving video signals broadcast by satellite, with 360 degree shielding (over the entire circumference of the cable) to protect the input interface with shielding.

In one or more embodiments, filtering, for example bandpass filtering (for example of the LC type or of the RC type), is configured at the boundary between an analog subset on the one hand, and a digital subassembly or a power supply subassembly on the other hand.

In one or more embodiments, a filtering unit may be installed on the circuit board of the proposed apparatus, on the face of the circuit board on which is installed the shielding protecting the analog subassembly (or the analog part). The filtering unit may be connected to the analog subassembly protected by the shielding, and be installed on a signal path electrically connecting one or more components located outside the shielding, to the analog subassembly. In one or more embodiments, the filtering unit may comprise a capacitive component installed under the shielding and connected to an analog ground, and may further comprise a filtering component placed at the input of the filtering unit in series on the signal path. Depending on the embodiment, the filtering component may be placed so it crosses the shielding or is in the immediate vicinity of the shielding exterior.

Thus, advantageously, due to the placement of the capacitive component of the filtering unit under the shielding and the placement of the filtering component of the filtering unit, placed at the input of the filtering unit in series on the signal path crossing the shielding or in the immediate vicinity (either immediately neighboring or as close as possible) of the shielding exterior, the effectiveness of the electromagnetic interference filtering may be improved. This electromagnetic interference is typically generated by components external to the shielding, whether they are components on the circuit board (for example the components of a disruptive block) or components external to the circuit board (for example the electromagnetic interference generated by a power supply of a computer server or PC into which the circuit board is inserted (for example in an expansion slot)), and if they were not filtered would disrupt the operation of the analog subassembly, by coupling to the signal entering under the shielding.

In one or more embodiments, the filtering unit proposed in one or more embodiments of one or more capture channels of the proposed apparatus may comprise a filtering component placed in series at the input of the filtering unit on a signal path electrically connecting components (e.g. electronic components) located outside the shield (for example a signal from an electromagnetically interfering unit outside the shield protecting the analog subassembly) to the analog subassembly, which is advantageously placed to cross the shielding, or, depending on the chosen embodiment, in the immediate vicinity of the shielding (as close as possible to the shielding, for example the shielding cover), so as to effectively filter out any electromagnetic interference external to the analog subassembly protected by the shielding (for example placed under a shielding cover). This placement of the input filtering component of the filtering unit as close as possible to the shielding, or, when possible, crossing the shielding (and therefore the cover when the shielding comprises a cover), advantageously makes it possible to limit or even avoid exposure of the filtered signal, that is output from this filtering component, to electromagnetic noise liable to disrupt the operation of the components protected by the shielding. Indeed, in the embodiments in which the filtering component is placed closest to the shielding, the length of the portion of the signal path exiting this component, located outside the shielding (portion of the signal path between the output of the filtering component and the shielding) is reduced as much as possible to prevent this portion of the path from picking up the surrounding electromagnetic noise which would then be injected with the signal entering the shielding, or limits the amount of noise pickup as much as possible. In the embodiments in which the filtering component is positioned to cross the shielding, the signal output from this component is not contaminated by the surrounding noise since it is protected by the shielding.

The filtering unit proposed in one or more embodiments of one or more capture channels of the proposed apparatus may further comprise a capacitive component connected to an analog ground, located downstream of the filtering component on the signal path, which therefore receives as input a filtered signal coming from the filtering component positioned in series. This capacitive component is installed under the shielding, and thus positioned inside the shielding (for example under a shielding cover protecting the analog subassembly), in order to be able to position the filtering component, located upstream, so it crosses the shielding or is in the immediate vicinity of the shielding.

This capacitive component of the filtering unit will behave like a wire for high frequency signals traveling through it, especially for high-frequency noise signals, and therefore can be used to direct to ground the high frequency interference present in the signal that is output from the filtering component. If this capacitive component of the filtering unit were placed outside the shield protecting the analog subassembly, the filtering component(s) would filter noise from the signal passing through it, but this noise would be coupled to the capacitive component of the filtering unit by electrical ground noise, so that the noise filtered by the filtering component(s) would still end up on the opposite side to the digital ground of the filtering component(s) (this noise would be a mirror of the digital ground noise present outside the shielding), and would penetrate the analog subassembly protected by the shielding. The filtering unit would therefore be less effective, and the proposed placement of the capacitive component of the filtering unit under the shielding advantageously would avoid this disadvantage.

The efficiency of the proposed filtering unit is thus preserved, on the one hand by placing the input filtering component of the filtering unit (placed in series) as close as possible to, or, depending on the embodiment, crossing the shielding (for example the shielding cover), and on the other hand by placing the output capacitive component of the filtering unit under the shielding. Thus, according to the chosen embodiment, the proposed apparatus advantageously makes it possible to preserve (and therefore to improve in comparison to existing configurations) the efficiency of the filtering carried out by the filtering unit between each analog subassembly and the corresponding digital subassembly, or between each analog subassembly and the corresponding power supply subassembly.

In one or more embodiments, the analog subassembly considered may comprise one or more analog components for receiving radio frequency signals, which will typically be the case for each analog subassembly of each capture channel protected by shielding comprising a shielding cover.

For example, the proposed filtering unit could be implemented, for one or more capture channels of the proposed apparatus, on each signal path between an analog subassembly protected by shielding and a digital/power supply unit installed on the circuit board of the proposed apparatus, the digital/power supply unit comprising a digital subassembly and/or a power supply subassembly, the digital subassembly comprising one or more digital components, and the power supply subassembly comprising one or more power supply components of the analog subassembly.

In particular, in one or more embodiments, the signal path considered may be between the analog subassembly and a digital subassembly, which advantageously allows the filtering unit to be used in the proposed configuration to filter the signals between the analog subassembly and the digital subassembly. For example, in one or more embodiments, the filtering unit will be configured to filter a control signal coming from the digital subassembly to control the analog subassembly, for example to configure it (for example a control signal in I2C format).

In one or more embodiments, the signal path considered may be between the analog subassembly and a power supply subassembly, which advantageously makes it possible to use the filtering unit in the proposed configuration to filter the signals between the analog subassembly and the power supply subassembly. For example, in one or more embodiments, the filtering unit will be configured to filter a power supply signal coming from the power supply subassembly to supply electricity to the analog subassembly.

In one or more embodiments, the filtering unit will comprise an LC or RC type of filter cell.

In one or more embodiments, the shielding will comprise a shielding cover, and the filtering component placed in series on the signal path will be positioned to cross the shielding cover or be in the immediate vicinity of the shielding cover.

In one or more embodiments, the shielding will comprise a shielding cover, and the filtering component placed in series will be an inductive component placed in series and straddling the shielding cover, between the digital/power supply unit and the analog subassembly.

In other embodiments, the shielding will comprise a shielding cover, and the filtering component placed in series will be a resistive component placed in series straddling the shielding cover, between the digital/power supply unit and the analog subassembly.

Figure 3C:
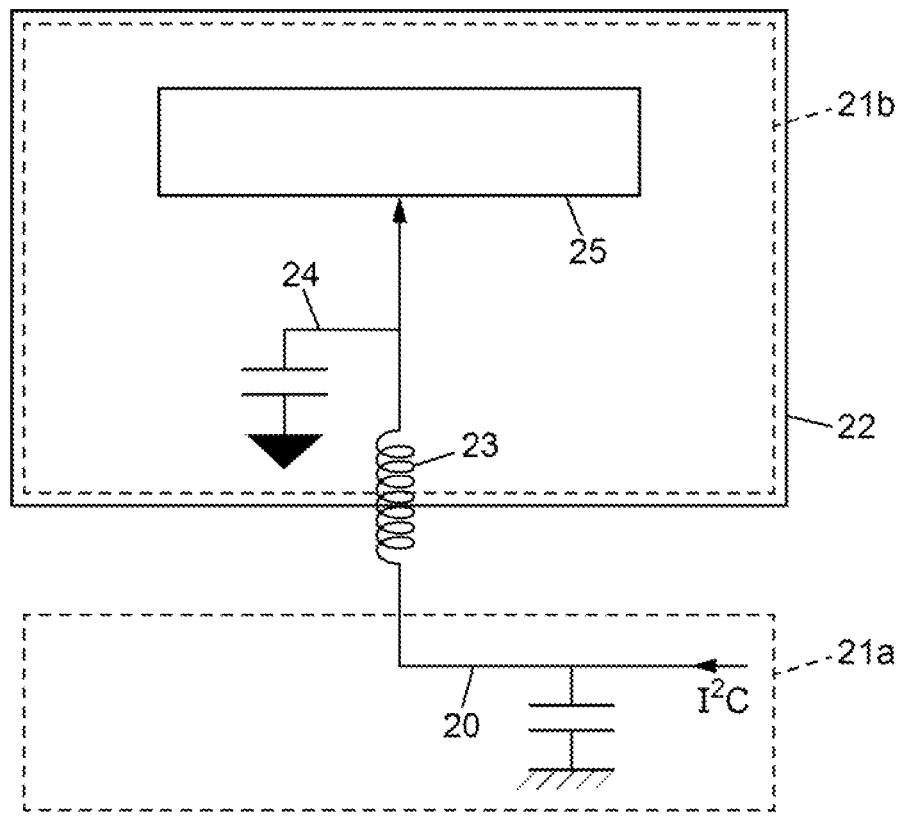
FIG. 3c is a diagram illustrating part of an example capture channel according to one or more embodiments.

A non-limiting example of an implementation of a filtering unit proposed in one or more embodiments is illustrated by FIG. 3c.

As illustrated in FIG. 3c, filtering, for example of the LC type comprising a capacitor C 24 (capacitive component) connected to an analog ground and an inductor L 23 (filtering component), may be configured between an incoming digital configuration bus 20 (for example the I2C bus as shown in the figure) and an input of an analog component or of a group of analog components (corresponding for example to low-noise amplifier 3b_k, to one of tuners TUN1 or TUN2 3c1_k and 3c2_k, or to analog-to-digital converter (ADC) of component 3d_k of FIG. 2a) forming an analog subassembly 25 protected by a shielding cover 22. Filtering is thus carried out between a noise-generating digital subassembly (such as subassembly 21a illustrated in FIG. 3c) and an analog/radio frequency subassembly (such as subassembly 21b illustrated in FIG. 3c).

With reference to FIG. 3c, in embodiments where LC-type filtering is used to improve the efficiency of the filtering between an analog subassembly comprising one or more analog components and protected from electromagnetic interference by a cover, on the one hand, and a digital component subassembly and/or a power supply subassembly on the other hand, the LC filtering can be configured by placing the inductive component 23 (filtering component) as close as possible to the shielding cover 22, or even, if the configuration of shielding cover 22 so allows (in particular if the shielding cover is high enough), placing the inductive component so it is straddling but under the shielding cover 22 (crossing the shielding cover 22) between digital part 21a and analog part 21b. The low impedance part of the LC filter (capacitive component 24 connected to ground) is placed in the analog part, under the protective shield.

DC/DC power supplies have the advantage of providing very good performance while not growing hot, but have the disadvantage of generating noise which can interfere with the signals processed by the analog components of one or more capture channels of the proposed apparatus. Indeed, a DC/DC power supply has a determined operating frequency, but also produces harmonics of this operating frequency, which generates wide-band noise on the output signal from the DC/DC power supply.

In one or more embodiments where one or more DC/DC power supplies are used to power an analog subassembly (a component or a group of components, for example such as the low-noise radio frequency amplifier) of the proposed apparatus, a linear regulator, for example with low dropout (LDO) to prevent it from overheating, may be placed between the output of the power supply and the input of the analog subassembly.

For example, as illustrated in FIG. 3c, one can choose a linear regulator configured to convert the noisy signal output from the DC/DC power supply at 2.2V into a noise-free signal in a determined frequency band called the band of rejection.

However, any linear regulator will have parasitic capacitors which will not filter out high-frequency signals (a capacitor behaving like a wire at high frequencies). Therefore, the linear regulator will be able to filter out the signal noise coming from the DC/DC power supply within the band of rejection, but will copy this noise outside the band of rejection.

In order to filter out this high-frequency noise at the output of a linear regulator, it is possible, in one or more embodiments, to use a low-pass filter, for example such as an LC filter. Advantageously, in the embodiments where an LC filter is used, provision may be made to position the inductive component as close as possible, or, depending on the embodiment, straddling beneath the shielding cover protecting the analog/radio frequency subassembly powered by the DC/DC power supply.

Figure 3D:
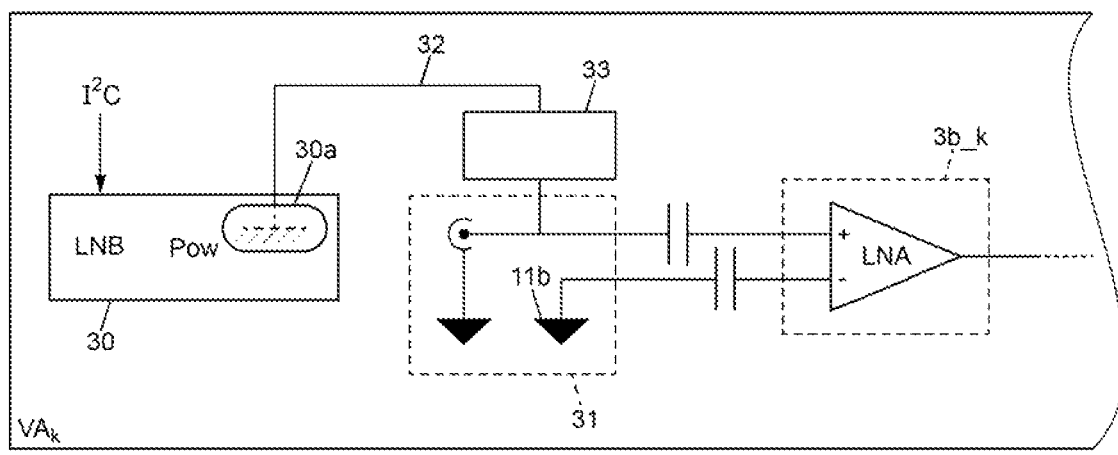
FIG. 3d is a diagram illustrating part of an example capture channel.

FIG. 3d shows part of capture channel $VA_k$ according to one or more embodiments, comprising a power supply 30 configured to power a satellite dish receiver connected to input interface $IN_k$ of capture channel $VA_k$. The output from power supply 30 typically has a very low impedance (represented in the figure by a virtual ground 30a). Power supply 30 makes it possible to power the electronic circuits of the satellite dish receiver, via the cable, for example a coaxial cable, connecting the satellite dish receiver to input interface 31 of the capture channel, in particular to convert the frequencies of the signals received by the satellite dish receiver to satellite receiving band L. The satellite dish receiver will indeed typically be configured to perform a translation of the received satellite signals to the "L-band" frequency band in which the signals received on input interface $IN_k$ of capture channel $VA_k$ will be located. The frequency translation circuits of the satellite dish receiver will therefore be powered by a power supply 30 ("LNB Pow" in FIG. 3d) of the proposed apparatus in one or more embodiments.

Power supply 30 may advantageously be chosen to be configurable, for example by means of an I2C command interface, in order to be switched off by configuration when input interface $IN_k$ of capture channel $VA_k$ is not connected to a satellite dish receiver, but rather for example to a cable and/or terrestrial video broadcasting signal receiver. This advantageously makes it possible to prevent power supply 30 from producing noise interfering with the operation of the other components of the card, in particular the components of the analog subassemblies that are particularly sensitive to noise.

Thus, the user of the proposed apparatus can configure power supply 30 as well as other components of the proposed apparatus, by means of a control interface, for example of the I2C type, according to the type of receiver connected to input interface $IN_k$ of capture channel $VA_k$. To this end, in one or more embodiments, a human-machine interface (HMI) may be provided in order to enable a user of the proposed apparatus to control the various configurable elements of the proposed apparatus by means of a control interface, for example of the I2C type.

Figure 3E:
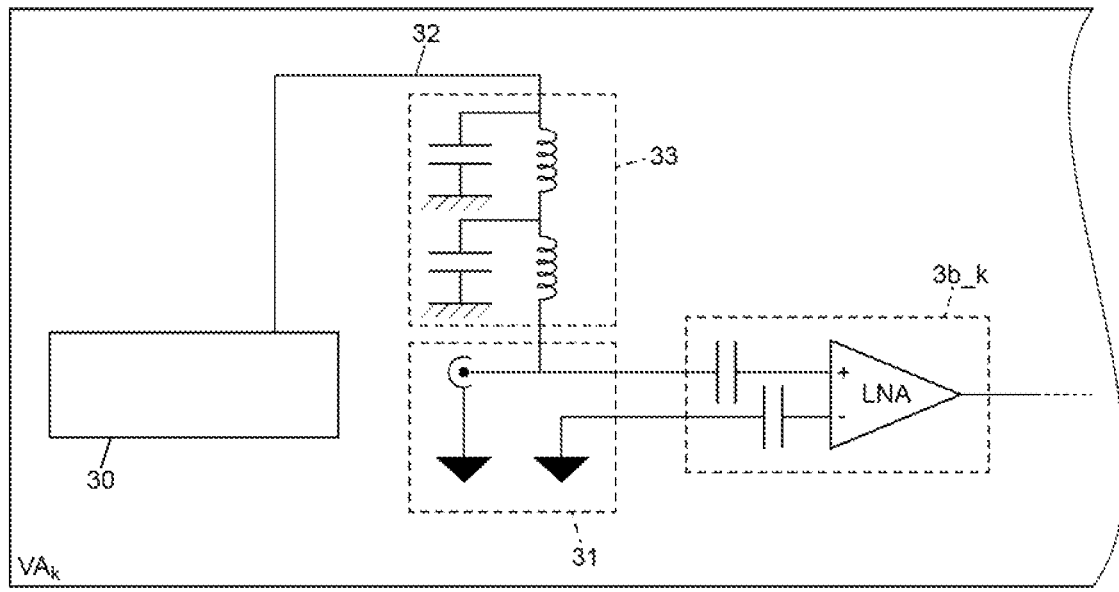
FIG. 3e is a diagram illustrating part of an example capture channel according to one or more embodiments.

In one or more embodiments, in order to prevent virtual ground 30a, representing the very low impedance of power supply 30, from disrupting signal path 32 to input interface 31 $IN_k$ of capture channel 31, a filter cell 33 is inserted on signal path 32 between power supply 30 and input interface 31 $IN_k$ of capture channel $VA_k$. In one or more embodiments, a fourth-order filter cell 33 may be used, as illustrated in FIG. 3e.

Preferably, the filter cell will be configured to carry out band-pass filtering in a frequency band comprising the frequency band of the signals received on input interface 31 $IN_k$, for example comprising the "L-band" frequency band.

Different solutions for placement or routing of components on the board of the proposed apparatus are set forth below, in the context of embodiments of the proposed apparatus which may be implemented in isolation or in combination with one another.

In one or more embodiments of the proposed apparatus, the components of each capture channel of the proposed apparatus processing analog signals (for example, with reference to FIG. 2a, input interface components IN $3a\_k$, amplifier LNA $3b\_k$, tuner $3c1\_K$ and $3c2\_k$, and the analog-to-digital converter in demodulator $3d\_k$) may be protected by one or more electromagnetic protection covers. Preferably, in one or more embodiments, several separate shielding covers may be used for the components to be protected, or even a protective cover for each component to be protected, so as to advantageously avoid the occurrence of crosstalk effects between the different radio frequency channels. Thus, in one or more embodiments, individually routed electromagnetic shielding may be provided on the components processing analog signals from one or more capture channels, in order to guard against crosstalk effects.

For example, with reference to FIG. 2a, in one or more embodiments, it is possible to provide, for one or more capture channels, an electromagnetic protection cover for each amplifier component LNA $3b\_k$ and for each tuner component (first tuner $3c1\_k$ and second tuner $3c2\_k$) of the capture channel.

Figure 4A:
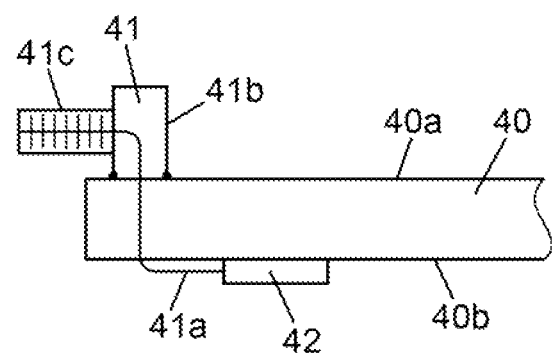
FIG. 4a is a diagram illustrating part of an example capture channel according to one or more embodiments.

FIG. 4a shows a partial side view of circuit board 40 of the proposed apparatus in one or more embodiments, on which is installed a connector 41 of an input interface of a capture channel of the apparatus. Connector 41 comprises a part 41b soldered to the board, a part 41c for connecting a data transmission cable, and a conductor. With reference to FIG. 4a, in one or more embodiments, conductor 41a of connector 41 passes through board 40, and is connected to a low noise amplifier 42 on face 40b of the board opposite to that 40a on which the connector 41 is installed.

Figure 4B:
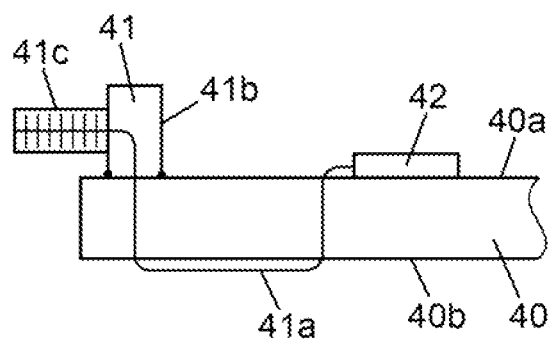
FIG. 4b is a diagram illustrating part of an example capture channel.
Figure 4C:
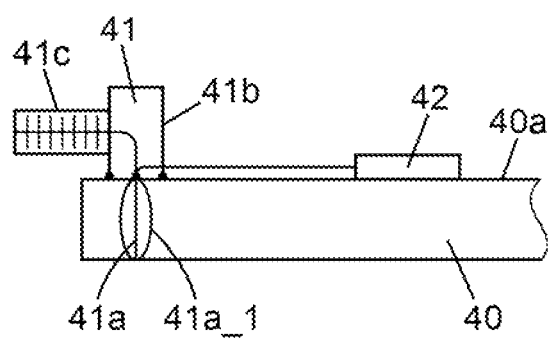
FIG. 4c is a diagram illustrating part of an example capture channel.
Figure 4D:
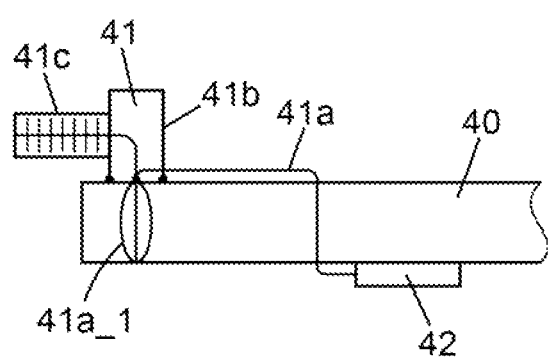
FIG. 4d is a diagram illustrating part of an example capture channel.

As illustrated by FIGS. 4b, 4c, and 4d, other placements and routings of connector 41 and of low-noise amplifier 42 are conceivable, but do not offer all the advantages of the assembly of FIG. 4a, however.

For example, as illustrated in FIGS. 4b and 4c, it is conceivable to place connector 41 and low-noise amplifier 42 on the same face of board 40. Placing the active components of a circuit board on the same face of that board would certainly offer the advantage of a low manufacturing cost. However, the assembly illustrated in FIG. 4b proposes a conductor 41a of connector 41 which travels back through the thickness of the board 40 in order to be connected to low-noise amplifier 42, which would lengthen the path of the signal and degrade its quality at the input to the low-noise amplifier 42. Also, since it is difficult to manufacture a via (a connection between layers in a printed circuit, also called a "plated through-hole") that passes through layers of the board while ensuring an impedance of 75Ω at the input of low-noise amplifier 42, as discussed above, it will be all the more difficult to obtain an impedance with two vias.

In order to prevent the conductor of the connector from traveling back through the thickness of board 40, the assembly illustrated in FIG. 4c provides for conductor 41a of connector 41 to be connected to low-noise amplifier 42, the two components being placed on the same face 40a of board 40. However, according to the setup in FIG. 4c, part 41a_1 of conductor 41a of the connector is unterminated, which creates a "stub" that generates a notch filtering effect, due to signal reflections in unterminated part 41a_1 of conductor 41a.

The setup illustrated by FIG. 4d combines the disadvantages of the setups in FIGS. 4b (double via for a conductor crossing the board twice) and 4c (stub creating signal reflections).

In one or more embodiments, most, or possibly all, of the passive components associated with an active component (such as the low-noise amplifier or a tuner of a capture channel for example) may be installed on the same face of the board as the active component, and be installed under electromagnetic shielding protecting the corresponding active component.

Thus, in one or more embodiments, at least some of the passive components associated with an active component protected by electromagnetic shielding are installed under the same shielding and on the same layer as the corresponding active component. This layout of the passive components, taking into account their associated active component, is in conflict with customary practice in terms of component layout, according to which the passive components are placed on the lower layer of the board next to their corresponding active component which is placed on the upper layer of the board, in order to save space.

Figure 4E:
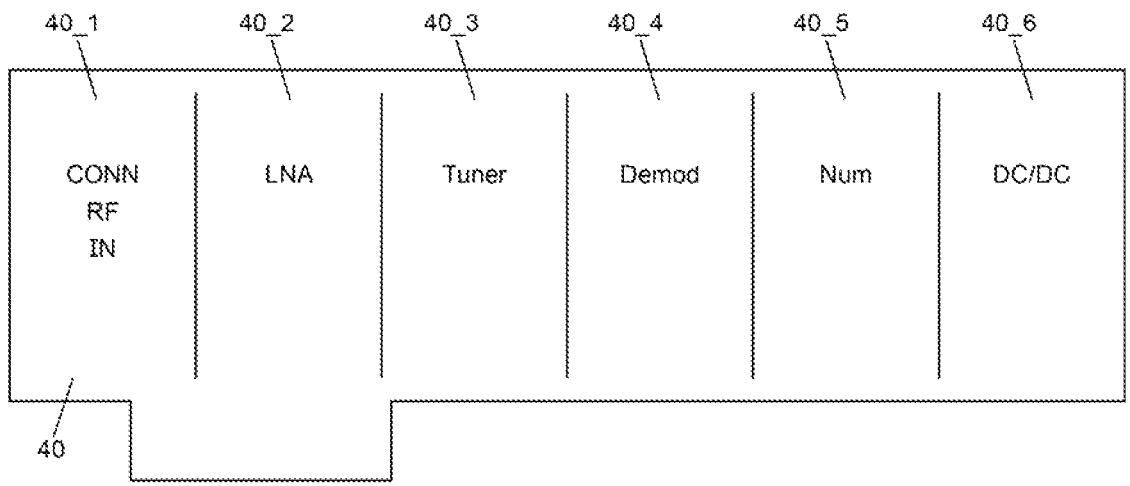
FIG. 4e is a diagram illustrating a capture apparatus according to one or more embodiments.

In order to best isolate the components sensitive to digital noise (components processing analog signals) from the components generating digital noise, the main components of a capture channel are located in physically separate areas on the board of the proposed apparatus, as shown in FIG. 4e: in one or more embodiments, considering circuit board 40 of the proposed apparatus illustrated in the figure, from one end to the other starting from the left, the input connectors of the capture channels of the proposed apparatus can be combined in a first zone 40_1 of board 40, the low-noise amplifier of each capture channel can be located in a second zone 40_2 of board 40, adjacent to first zone 40_1 of board 40, the first and second tuners of each capture channel can be located in a third zone 40_3 of board 40, adjacent to second zone 40_2 of board 40, the demodulator of each capture channel can be located in a fourth zone 40_4 of board 40, adjacent to third zone 40_3 of board 40, the apparatus controller and the virtualization component, possibly grouped together within a same digital component, for example in the form of an FPGA, can be located in a fifth zone 40_5 of board 40, adjacent to fourth zone 40_4 of board 40, and the DC/DC power supply of each capture channel can be located in a sixth zone 40_6 of board 40, adjacent to fifth zone 40_5 of board 40. Advantageously, each among the first, second, third, fourth, fifth, and sixth zones is configured to be physically separate on the map from its neighboring zone(s). Preferably, the zones are advantageously ordered by increasing amplitude of the processed signals: the first zone contains components processing analog signals with an amplitude on the order of dBmV, the second zone contains components processing radio frequency analog signals, the third zone contains components processing intermediate frequency (IF) analog signals, the fourth zone contains components which perform an analog-to-digital conversion, the fifth zone contains components processing digital signals of approximately 1 V in amplitude, and the sixth zone contains components processing digital signals of approximately 12 V in amplitude. However, the greater the amplitude of a signal, the more immune it is to surrounding noise. Thus, while the components of the first zone are extremely sensitive to noise from the DC/DC power supply (sixth zone), which justifies placing the first zone as far away as possible from the sixth zone, the components of the fifth zone are not very sensitive to noise from the DC/DC power supply, which justifies placing them in a zone adjacent to the fifth zone.

The electrical connections between the power supply of the computer server in which the proposed apparatus is inserted and the controller component(s) for the apparatus and for making use of the virtualization and the DC/DC power supply by means of the digital bus of the expansion card on which the components of the proposed apparatus are located create field lines in the ground plane of the board for the return current of the electric current of the apparatus. These field lines create digital noise which is likely to disrupt the components processing analog signals located on the board, and in particular the ground of the analog zones of the board. Thus, the analog ground of the proposed apparatus (ground for the analog zones of the board) is contaminated by noise generated by the return field lines of the digital portions and of the power supplies (of the proposed apparatus as well as of the computer server in which the apparatus is inserted).

To mitigate these detrimental effects, in one or more embodiments, a slit in the ground plane may advantageously be made to cut the return field lines in the ground plane.

In one or more embodiments, one or more of the capture channels of the proposed apparatus may comprise a dual demodulator, so as to advantageously produce a dual video transport stream on a same capture channel.

Figure 5A:
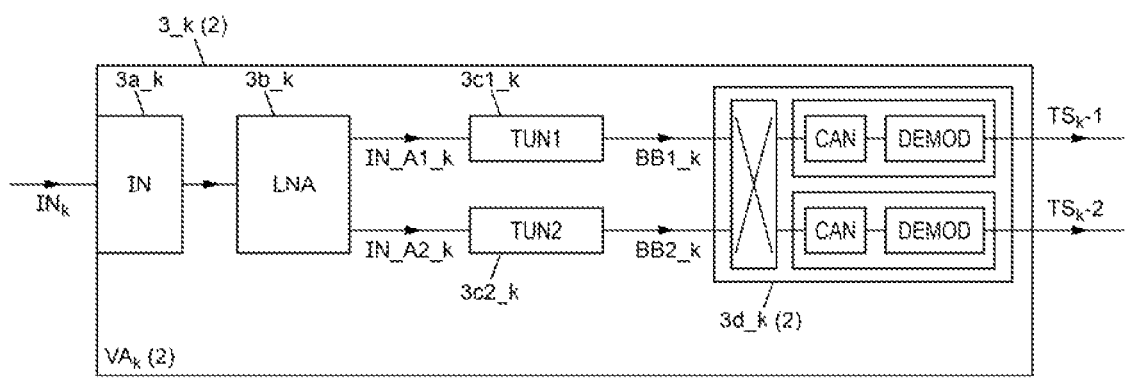
FIG. 5a is a diagram illustrating an example capture channel according to one or more embodiments.

FIG. 5a illustrates an example of a capture channel according to one or more embodiments, for example usable for one or more of the capture channels of a video capture apparatus of the type illustrated in FIG. 1.

Referring to FIG. 5a, capture channel $VA_k(2)$ illustrated in the figure comprises, similarly to capture channel $VA_k$ illustrated in FIG. 2a and described above, an input interface $3a\_k$ and a low-noise radio frequency distribution amplifier $3b\_k$ which can be configured to operate as described above in connection with the example capture channel $VA_k$ illustrated in FIG. 2a.

Capture channel $VA_k(2)$ also comprises a first dual tuner $3c1\_k$ and a second dual tuner $3c2\_k$, which respectively comprise two first tuners and two second tuners of the type of the first and second tuners described above in connection with the example capture channel $VA_k$ illustrated in FIG. 2a. Thus, in one or more embodiments, the first dual tuner $3c1\_k$ comprises two tuners, each configured to receive an input signal as input and to downconvert it from the satellite broadcasting frequency band in order to generate a baseband signal, and the second dual tuner $3c2\_k$ also comprises two tuners, each configured to receive an input signal as input and to downconvert it from the terrestrial and/or cable broadcasting frequency band in order to generate a baseband signal.

Unlike converter CAN and demodulator $3d\_k$ of FIG. 2a, converter CAN and demodulator $3d\_k(2)$ of channel $VA_k(2)$ is a dual converter CAN and demodulator, in that it produces not one video transport stream for the capture channel, but two video transport streams for capture channel $VA_k(2)$ or, in other words, a dual video transport stream for capture channel $VA_k(2)$.

In one or more embodiments, converter-demodulator CAN/DEMOD $3d\_k(2)$ will be configured to receive first and second baseband signals BB1_$k$ and BB2_$k$ as input and to generate, on the basis of first and second baseband signals BB1_$k$ and BB2_$k$, two video transport streams $TS_k\_1$ and $TS_k\_2$. Converter-demodulator $3d\_k(2)$ may typically comprise two analog-to-digital converters, respectively coupled to two digital demodulators configured to demodulate the digital signal produced by the corresponding converter CAN from analog signal BB1_$k$ and/or BB2_$k$ received as input, as well as possibly a mixer, as illustrated in FIG. 5a. Advantageously, converter-demodulator CAN/DEMOD $3d\_k(2)$ will be configured to receive first and second baseband signals BB1_$k$ and BB2_$k$ as input and to generate, on the basis of first and second baseband signals BB1_$k$ and BB2_$k$, two video transport streams, by processing each of input signals BB1_$k$ and BB2_$k$ by a CAN/DEMOD block of the dual converter-demodulator. In one or more embodiments, each of the two dual demodulators may be configured to receive the first and second baseband signals BB1_$k$ and BB2_$k$ as input, and to choose (by configuration) which of the first and second baseband signals BB1_$k$ and BB2_$k$ is used as input and demodulated.

Thus, in the case where input interface $3a\_k$ is connected to a source of a satellite video broadcasting input signal IN_$k$, this signal is amplified by amplifier $3b\_k$ to generate an amplified satellite video broadcasting input signal IN_A1_$k$. Amplified satellite video broadcasting input signal IN_A1_$k$ is downconverted by dual tuner $3c1\_k$ to generate a baseband signal BB1_$k$, which is input to dual converter-demodulator $3d\_k(2)$, where it is demodulated by one of the converter-demodulators to produce a video transport stream ($TS_k$-1 or $TS_k$2) of the dual video transport stream. In the event that input interface $3a\_k$ is connected to a source of a cable or terrestrial video broadcasting input signal, this signal is amplified by amplifier $3b\_k$ to generate an amplified cable or terrestrial video broadcasting input signal IN_A2_$k$. The amplified terrestrial or cable video broadcasting input signal IN_A2_$k$ is downconverted by dual tuner $3c2\_k$ in order to generate a baseband signal BB2_$k$, which is input to dual converter-demodulator $3d\_k(2)$, where it is demodulated by one of the converter-demodulators to produce a video transport stream ($TS_k$-1 or $TS_k$2) of the dual video transport stream.

In one or more embodiments, the proposed apparatus may comprise one or more of the plurality of N capture channels which comprises two dual tuners, and a dual demodulator configured to receive the first and second baseband signals as input, and to generate on the basis of the first and second baseband signals a respective dual video transport stream provided as input to the multi-channel virtualization module. In these embodiments, the use of dual tuners and a dual converter-demodulator advantageously makes it possible to double the processing capacity of each capture channel, each capture channel then being configured to generate a dual video transport stream from the modulated video broadcasting input signals.

Figure 5B:
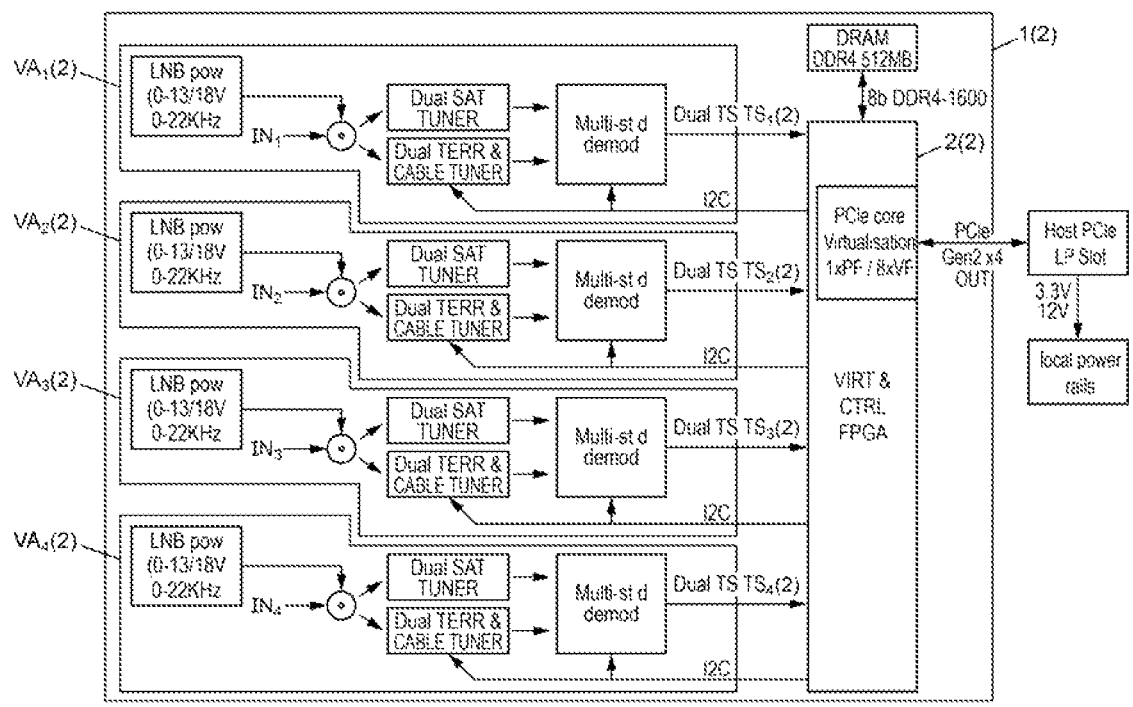
FIG. 5b is a diagram illustrating an example apparatus for capturing video signals according to one or more embodiments.

FIG. 5b illustrates an example of a video signal capture apparatus according to one or more embodiments.

In the non-limiting example illustrated in FIG. 5b, capture apparatus 1(2) comprises N=4 capture channels $VA_1(2)$ ... $VA_4(2)$. Each of the N capture channels $VA_k(2)$, k=1, ..., 4, is configured to produce a dual video transport stream $TS_k(2)$, k=1, ..., 4, provided as input to a multi-channel virtualization module 2(2). Nevertheless, those skilled in the art will realize that the proposed apparatus is not limited to a particular number N (N>1) of capture channels or to a particular type of capture channel, and that, depending on the embodiment, the proposed apparatus may comprise several capture channels outputting two video streams, several capture channels outputting one video stream, and/or a combination of one or more capture channels outputting one video stream and one or more capture channels outputting two video streams.

Referring to FIG. 5b, the video capture apparatus 1(2) comprising one or more capture channels of the type illustrated in FIG. 5a will thus advantageously be a multi-band video capture apparatus, to which it will be possible to connect, at the user's choice, a carrier for cable, terrestrial, or satellite video broadcasting signals. Each input signal IN_$k$ that the proposed apparatus will be capable of capturing will thus be able to carry two signals among a wide-band analog signal carrying a radio frequency signal in the satellite broadcasting frequency band, a radio frequency signal in the terrestrial broadcasting frequency band, and a radio frequency signal in the cable broadcasting frequency band.

In one or more embodiments, the proposed apparatus may have N=4 capture channels of the type illustrated in FIG. 5a and described in relation to the example of FIG. 5a. Each of the four capture channels of the proposed apparatus will thus be configured to produce two respective video transport streams, such that the apparatus will be able to provide eight video transport streams as input to the virtualization module and thus implement the virtualization of eight video transport streams output from the apparatus.

In one or more embodiments, the N=4 capture channels $VA_k(2)$ of apparatus 1(2) and the multi-channel virtualization module 2(2) are installed on an expansion card, for example for a computer server, which has the advantage of enabling apparatus 1(2) to be inserted into any computer apparatus having an expansion slot in the corresponding format, for example such as a personal computer, a computer server, etc Depending on the embodiment, the expansion card may be in PCI, PCIe, SATA, CXL format, or any other expansion card format, for example for a computer server. Providing an apparatus for capturing modulated video broadcasting signals in PCIe expansion card format makes it possible to take advantage of the very widespread use of this expansion card format in all types of computer apparatuses. In the following, we consider the non-limiting example of a capture apparatus implemented on an expansion card in PCIe format. Nevertheless, those skilled in the art will realize that the proposed apparatus is not limited to a particular expansion card format, and that any expansion card format for a computer server may be used in embodiments of the proposed apparatus.

However, due to its small size, the PCIe format requires placing the components of each of capture channels $VA_k(2)$ close to each other, which causes electromagnetic interference that should be treated in order to obtain a desirable level of performance for a professional-grade video capture card.

With reference to FIGS. 5a and 5b, in one or more embodiments, each capture channel $VA_k$ (2) of apparatus 1(2) of FIG. 5b comprises, as illustrated by FIG. 5a, an input interface IN configured to receive a respective input video signal IN_$k$ capable of carrying two signals to be processed by capture channel $VA_k(2)$. Capture channel $VA_k(2)$ is configured to be capable of processing two signals carried by the input video signal IN_$k$ received, and to generate a dual stream (comprising two demodulated video streams respectively corresponding to the two signals carried by signal IN_$k$ received as input) of respective video transport streams $TS_k(2)$ as output, and to provide this as input to the multi-channel virtualization module 2(2).

In one or more embodiments, input interface unit IN may be configured to receive frequency-multiplexed signals in the frequency bands of interest (for example S/S2/S2X, T/T2, and/or C/C2). For example, input interface unit IN may be configured to receive all channels of TNT. Depending on the chosen embodiment and the configuration of the proposed apparatus, one or two signals among the signals received by input interface unit IN may be extracted by a tuner (dual tuner ("Dual SAT TUNER" and "Dual TERR & CABLE TUN" in the case where two signals received on input interface IN are processed by capture channel $VA_k(2)$) and demodulated in parallel.

In one or more embodiments, multi-channel virtualization module 2(2) may be implemented within a component, for example of the FPGA type, which will further comprise a control module of the proposed apparatus, and a capture channel driver module configured to configure and/or control one or more capture channels $VA_k$, for example by means of a control signal, for example of the I2C type. Depending on the embodiment, the multi-channel virtualization module, control module, and driver module may be implemented within one or more electronic components of the proposed apparatus, and may be implemented (separately or jointly) in software form, in hardware form such as an ASIC-type circuit, or in the form of a combination of hardware and software elements, for example such as a software program intended to be loaded and executed on an FPGA type of component. The control module will typically be configured to drive the operations of the other modules of the proposed apparatus, and may be, depending on the embodiment, a component or part of a component implementing one or more processors or a calculation unit, operably coupled to a memory, for controlling the operations of the proposed apparatus, and in particular for controlling the virtualization module and the driver module for the capture channels.

In one or more embodiments, multi-channel virtualization module 2(2) may be configured to generate as output, for example on a PCIe type of output interface, from 2×4 video transport streams (or four dual video transport streams) received as input, a stream of frames OUT, each carrying data of a video transport stream among the 2×4 video transport streams provided as input to multi-channel virtualization module 2(2). Depending on the implementation, the format of the frames will preferably correspond to the format of the expansion card on which the video capture apparatus 1(2) is installed.

For example, output stream OUT may comprise protocol frames corresponding to the format chosen for the expansion card (for example, PCI, PCIe, SATA, CXL). In the preferred embodiment in which video capture apparatus 1 is located on an expansion card in PCIe format, multi-channel virtualization module 2(2) will be configured to output on a PCIe bus, for example of a computer server, a stream of PCIe protocol frames, each carrying data of a video transport stream among N=4 dual video transport streams $(TS_k(2))_{k=1,\ldots,4}$ (i.e. the eight video transport streams) possibly supplied as input to multi-channel virtualization module 2(2).

In one or more embodiments, input interface IN of each of the four capture channels $VA_k(2)$ is powered by a low-noise power supply "LNB Pow", so as to be able to connect a reception cable for a satellite video broadcasting signal in order to supply electricity to the dish which may be connected to input interface IN by means of a cable (typically coaxial). In particular, in one or more embodiments, input interface IN of each of the four capture channels $VA_k(2)$ may be protected by shielding, and for example be coaxial, for example in order to be able to advantageously connect, to the input of the capture channel, a coaxial cable for receiving radio frequency signals, for example such as a cable for receiving satellite video broadcasting signals, with 360 degree shielding (over the entire circumference of the cable) to protect the input interface with shielding.

As illustrated in FIG. 5b, in one or more embodiments, the proposed apparatus may comprise a control and virtualization module 2(2), implemented within an FPGA component, comprising a virtualization engine configured to receive up to four dual video transport streams as input and to treat up to eight channels, and comprising a controller, operably coupled with a memory (for example DRAM type as illustrated in the figure), configured to control the operations and functioning of the various components of apparatus 1(2). In particular, the controller may be configured to control the configuration of one or two dual tuners and the dual demodulator, for example by means of an I2C ("Inter-Integrated Circuit") type of command bus, as illustrated in the figure. Thus, in one or more embodiments, the operations of apparatus 1(2) may advantageously be controlled, for example by means of a human-machine interface, in order to drive the operation of the dual tuners and the dual demodulator of each capture channel according to the signals to be processed that are received at the input interface of the channel.

The configuration of the capture apparatus illustrated in FIG. 5b, and the configuration and composition of the capture channel illustrated in FIG. 5a, provide multiple advantages which are similar to those provided by the configuration of the capture apparatus illustrated in FIG. 1, and the configuration and composition of the capture channel illustrated in FIG. 2a, these being described above. They also provide a response to the technical problems described herein, and to do so can advantageously implement one or more of the proposed solutions for the configuration of the capture apparatus and its various components and modules, and the composition and/or the configuration of the components of a capture channel, as set forth above, in particular in relation to FIGS. 1, 2a, 3a, 3b, 3c, 3d, 3e, 4a, and 4e.

Those skilled in the art will thus realize that the proposed apparatus is not limited to a particular type of capture channel, and that the technical solutions and advantages described above in relation to the non-limiting examples of the apparatus of FIG. 1 and of the capture channel of FIG. 2a can be transposed to other implementations of the proposed apparatus with other types of capture channels, and in particular one or more capture channels of the type illustrated and described in relation to FIG. 5a, for example such as the apparatus of FIG. 5b providing four dual capture channels that can be implemented on a same circuit board in low-profile PCIe format.

Depending on the chosen embodiment, certain acts, actions, events, or functions of each of the methods described herein may be performed or take place in a different order than that in which they were described, or may be added, merged, or otherwise not performed or not take place, as the case may be. Furthermore, in some embodiments, certain acts, actions, or events are performed or take place concurrently and not sequentially.

Although described by means of a number of detailed exemplary embodiments, the proposed method and apparatus for implementing an embodiment of the method comprise various variations, modifications, and refinements which will be apparent to those skilled in the art, it being understood that these various variations, modifications, and improvements form part of the scope of the present disclosure, as defined by the following claims. Additionally, various aspects and features described above may be implemented together, or separately, or may be substituted for each other, and all of the various combinations and sub-combinations of aspects and features lie within the scope of the present disclosure. In addition, some systems and apparatuses described above may not incorporate all of the modules and functions described for the preferred embodiments.

The invention claimed is:

1. An apparatus for capturing analog-modulated video broadcasting signals, the apparatus comprising:
grouped on an expansion card for a computer server, a controller, a plurality of N capture channels, each of the N capture channels producing a respective video transport stream provided as input to a multi-channel virtualization module delivering frames carrying data of a respective video transport stream among the N respective video transport streams;
wherein each of the N capture channels comprises:
an input interface powered by a low-noise power supply arranged to receive a respective modulated video broadcasting input signal within an input frequency band;
a low-noise radio frequency distribution amplifier with a single input and dual outputs, arranged to, on the basis of the respective modulated video broadcasting input signal, produce a first amplified input signal and a second amplified input signal within the input frequency band, wherein the first amplified input signal is within a satellite broadcasting frequency band and the second amplified input signal is within a cable and/or terrestrial broadcasting frequency band;
a first tuner configured to receive the first amplified input signal and to downconvert it from the satellite broadcasting frequency band in order to generate a first baseband signal;
a second tuner configured to receive the second amplified input signal and to downconvert it from the terrestrial and/or cable broadcasting frequency band in order to generate a second baseband signal; and
a demodulator configured to receive the first or second baseband signal as input and to generate the respective video transport stream on the basis of said received baseband signal.

2. The apparatus according to claim 1, wherein the input interface is coaxial.

3. The apparatus according to claim 1, wherein the expansion card for computer server is in low-profile PCIe format.

4. The apparatus according to claim 1, wherein the input frequency band covers the frequency bands for cable, terrestrial, and satellite video broadcasting.

5. The apparatus according to claim 4, wherein the cable broadcasting frequency band covers the DVB-C and DVB-C2 frequency bands, the terrestrial broadcasting frequency band covers the DVB-T and DVB-T2 frequency bands, and the satellite broadcasting frequency band covers the DVB-S, DVB-S2, and DVB-S2X frequency bands.

6. The apparatus according to claim 1, wherein the distribution amplifier has a single differential input and dual differential outputs, wherein the input interface comprises a hot spot and a ground, and wherein the hot spot of the input interface is electrically coupled to the positive input of the distribution amplifier and the negative input of the distribution amplifier is coupled to the ground of the input interface.

7. The apparatus according to claim 6, wherein the first and second tuners have differential inputs, and wherein a first differential output of the distribution amplifier is electrically coupled to the differential input of the first tuner, and a second differential output of the distribution amplifier is electrically coupled to the differential input of the second tuner.

8. The apparatus according to claim 1, wherein the first tuner has a single input and dual I/Q outputs to the demodulator.

9. The apparatus according to claim 1, wherein the first tuner, second tuner, and distribution amplifier are each covered with radio frequency shielding.

10. The apparatus according to claim 1, wherein one or more of the plurality of N capture channels comprises a first dual tuner comprising two tuners each of the type of the first tuner, a second dual tuner comprising two tuners each of the type of the second tuner, and a dual demodulator comprising two demodulators of the type of the demodulator and configured to receive the first and second baseband signals as input and to generate, on the basis of the first and second baseband signals, a respective dual video transport stream supplied as input to the multi-channel virtualization module.

11. The apparatus according to claim 10, comprising four capture channels, each comprising a respective first dual tuner, a respective second dual tuner, and a respective dual demodulator, the apparatus being configured to supply at most eight video transport streams to the multi-channel virtualization module.

12. The apparatus according to claim 1, wherein the input interface is coaxial, and wherein the expansion card for computer server is in low-profile PCIe format.

13. The apparatus according to claim 1, wherein the expansion card for computer server is in low-profile PCIe format, and wherein the input frequency band covers the frequency bands for cable, terrestrial, and satellite video broadcasting.

14. The apparatus according to claim 13, wherein the cable broadcasting frequency band covers the DVB-C and DVB-C2 frequency bands, the terrestrial broadcasting frequency band covers the DVB-T and DVB-T2 frequency bands, and the satellite broadcasting frequency band covers the DVB-S, DVB-S2, and DVB-S2X frequency bands.

15. The apparatus according to claim 1, wherein the expansion card for computer server is in low-profile PCIe format, and wherein the distribution amplifier has a single differential input and dual differential outputs, wherein the input interface comprises a hot spot and a ground, and wherein the hot spot of the input interface is electrically coupled to the positive input of the distribution amplifier and the negative input of the distribution amplifier is coupled to the ground of the input interface.

16. The apparatus according to claim 15, wherein the first and second tuners have differential inputs, and wherein a first differential output of the distribution amplifier is coupled to the differential input of the first tuner, and a second differential output of the distribution amplifier is electrically coupled to the differential input of the second tuner.

17. The apparatus according to claim 16, wherein the first tuner has a single input and dual I/Q outputs to the demodulator.

18. The apparatus according to claim 17, wherein the first tuner, second tuner, and distribution amplifier are each covered with radio frequency shielding.

19. The apparatus according to claim 1, wherein the expansion card for computer server is in low-profile PCIe format, and wherein one or more of the plurality of N capture channels comprises a first dual tuner comprising two tuners each of the type of the first tuner, a second dual tuner comprising two tuners each of the type of the second tuner, and a dual demodulator comprising two demodulators of the type of the demodulator and configured to receive the first and second baseband signals as input and to generate, on the basis of the first and second baseband signals, a respective dual video transport stream supplied as input to the multi-channel virtualization module.

20. The apparatus according to claim 19, comprising four capture channels, each of the four capture channels comprising a respective first dual tuner, a respective second dual tuner, and a respective dual demodulator, the apparatus being configured to supply at most eight video transport streams to the multi-channel virtualization module.

* * * * *